Figure 8:
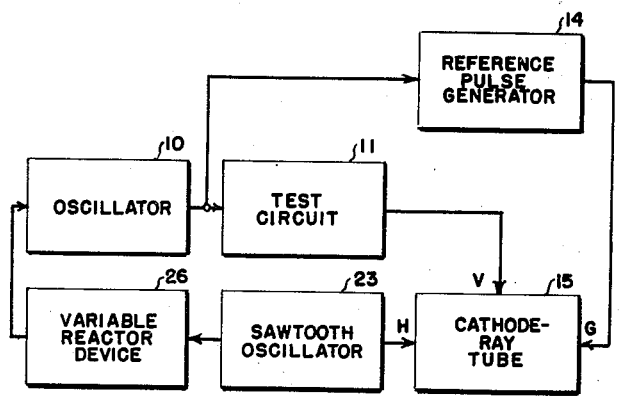

June 2, 1942. B. D. LOUGHLIN 2,285,038
SYSTEM FOR INDICATING ELECTRICAL PHASE-SHIFT CHARACTERISTICS
Filed Aug. 3, 1940 2 Sheets-Sheet 1
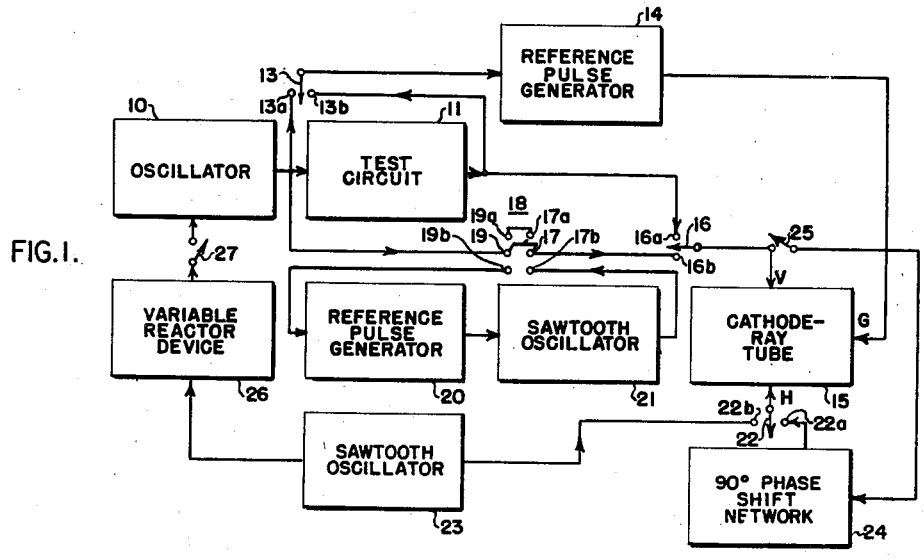
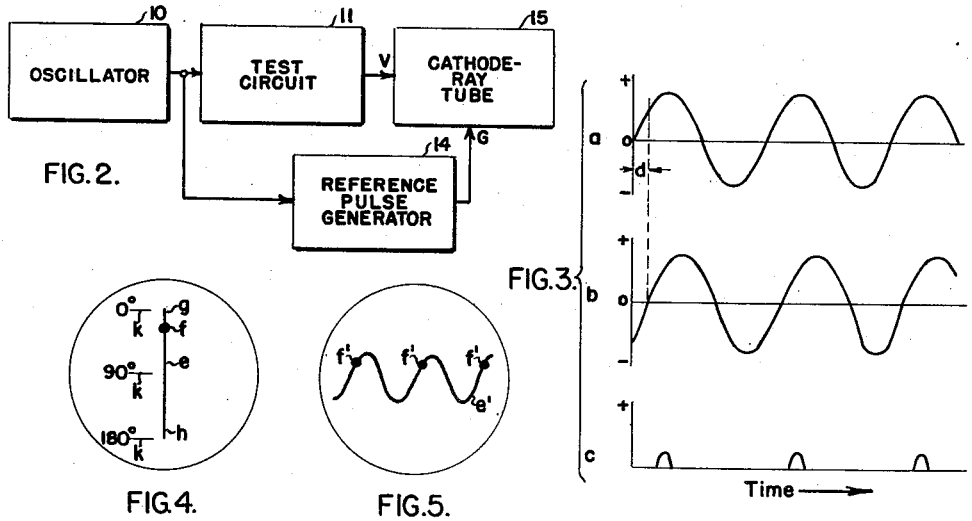
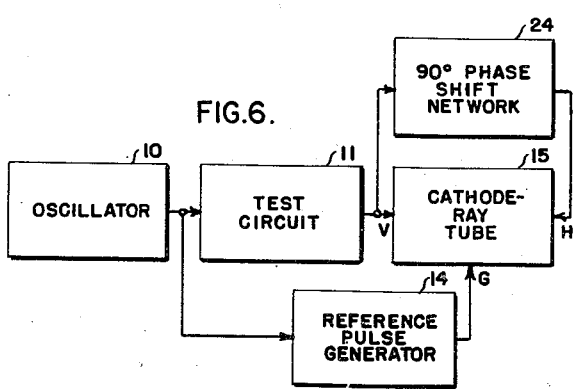
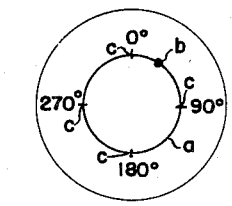
INVENTOR
BERNARD D. LOUGHLIN
BY Laurence B Dodds
ATTORNEY June 2, 1942.  B. D. LOUGHLIN  2,285,038
SYSTEM FOR INDICATING ELECTRICAL PHASE-SHIFT CHARACTERISTICS
Filed Aug. 3, 1940  2 Sheets-Sheet 2

INVENTOR
BERNARD D. LOUGHLIN
BY Laurence B. Dodds
ATTORNEY

Patented June 2, 1942

2,285,038

UNITED STATES PATENT OFFICE 2,285,038

SYSTEM FOR INDICATING ELECTRICAL PHASE-SHIFT CHARACTERISTICS

Bernard D. Loughlin, Great Neck, N. Y., assignor to Hazeltine Corporation, a corporation of Delaware Application August 3, 1940, Serial No. 350,722

17 Claims. (Cl. 172—245)

The present invention relates to an improved system for visually indicating operating characteristics of electrical apparatus and, particularly, to a system for producing a graphical representation of such operating characteristics. While the invention is of general application, it has particular utility in indicating the phase frequency characteristic of an electrical apparatus. The invention will, therefore, be described as a phase-indicating system which, in its preferred form, is adapted to produce graphically the phase frequency characteristic of an electrical apparatus over a range of frequencies of a signal applied thereto.

It is frequently desirable that an operating characteristic of an electrical apparatus be quickly and readily indicated under changing conditions of operation of the apparatus. For example, some of the new communication systems recently developed have brought about an appreciation of the importance of phase frequency characteristics of signal-translating systems, and it frequently is desirable quickly to ascertain the phase shift in such systems as the frequency of signals applied thereto deviates over a range of frequency deviation. Thus, where it is necessary to translate without distortion a complex voltage wave, as of saw-tooth or rectangular wave form, through signal apparatus, it is necessary that the apparatus have, over the range of frequency components comprising the voltage wave, a uniform amplitude-frequency characteristic and a phase-frequency characteristic which is a linear function of frequency with the intercept at zero or $n\pi$ electrical degrees of phase angle.

Heretofore, the phase frequency characteristic of a signaling apparatus has been determined only by the lengthy and tedious method of measuring the relative phase of a translated voltage at numerous frequencies in the range of frequencies to be translated by the apparatus, after which the phase frequency characteristic of the apparatus may be obtained by manually plotting these measured points. Not only has this involved much labor and expense and unnecessarily consumed a considerable amount of time simply in arriving at one phase-frequency characteristic of a given electrical apparatus, but, in addition, the manner of obtaining the results frequently leads to inaccuracies in the characteristic thus obtained. At best, the results have only been approximate since it obviously is impracticable to obtain data for the desired characteristic curve at each frequency in a wide range of frequencies to be translated.

There have been numerous methods proposed by which data may be derived from which to ascertain individual points on the operating characteristic curve of the electrical apparatus under consideration. The measurement of the amplitude frequency characteristic of the apparatus generally is relatively simple and easily ascertained. The phase frequency characteristic of an electrical apparatus has been, however, much more difficult to ascertain. The change of phase of a signal translated through the apparatus at a particular frequency may be ascertained in accordance with one prior art practice by individually supplying to the horizontal and vertical deflecting electrodes of a cathode-ray tube the signal applied to the apparatus and the signal translated by the apparatus. The phase shift introduced by the apparatus at that frequency is indicated by the resultant trace reproduced on the cathode-ray tube screen and the phase angle may thereafter be calculated from the measurements of the trace reproduced on the cathode-ray tube screen or may be ascertained from calibrated apparatus employed to shift the phase of one of the voltages applied to one set of the deflecting electrodes to an extent sufficient to obtain a predetermined, usually linear, trace. This obviously provides an indication of the phase shift only at one frequency and must be repeated for a representative number of frequencies within the range of frequencies to be translated by the apparatus.

The phase shift occurring in the electrical apparatus at a given frequency has been ascertained in accordance with another prior art method by individually measuring the amplitudes of the signal applied to the apparatus and of the signal translated by the apparatus and by the further measurement of the addition, subtraction, or multiplication of the amplitudes of the applied and translated signals to derive vectorial quantities from which the angle of phase shift may be calculated. This method also has the disadvantage that the phase shift is ascertained only at one frequency and the procedure must be repeated for a representative number of frequencies to derive the phase-frequency characteristic of the apparatus. The method obviously has the further disadvantage that inaccuracies are apt to be introduced in taking the several measurements at each frequency and in making the necessary calculations.

It is an object of the present invention, therefore, to provide an improved system for indicating the phase-frequency characteristic of an electrical apparatus and one which avoids one or more of the above-mentioned disadvantages and limitations of the prior art devices.

It is a further object of the invention to provide an improved system for indicating an operating characteristic of an electrical apparatus and one especially suitable for visually indicating the phase frequency characteristic of such apparatus.

It is an additional object of the invention to provide a system for visually producing a graph representative of the phase frequency characteristic of an electrical apparatus for each frequency in a predetermined range of frequencies of a signal translated by the apparatus.

It is a further object of the invention to provide a system for visually and simultaneously producing several operating characteristics of the same or independent electrical apparatus. The invention is especially suitable for visually and simultaneously producing phase and amplitude characteristics of an apparatus for a predetermined range of frequencies of a signal applied to the apparatus.

In accordance with one embodiment of the invention, a system for visually indicating the phase-shift characteristic of an electrical apparatus comprises a test circuit having connections for including the apparatus, a reference source of input periodic electrical waves, and means for deriving from the source and supplying to the circuit which includes the apparatus a sinusoidal electrical wave of a given frequency and for deriving an output periodic electrical wave therefrom modified in accordance with the phase-shift characteristic of the apparatus. There is also provided in the system means responsive to one of said input and output waves for producing a corresponding periodic trace, means for deriving a control effect from the other of the input and output waves, and means responsive to the control effect for modifying said trace visually to indicate the phase-shift characteristic of the apparatus at the aforesaid given frequency.

In accordance with a preferred form of the invention, a system for visually indicating the phase-shift characteristic of an electrical apparatus comprises a test circuit having connections for including the apparatus, means for generating oscillations the frequency of which periodically deviates over a predetermined range of frequency deviation, and means for supplying said oscillations to said circuit and for deriving therefrom oscillations translated by the electrical apparatus and modified in accordance with the phase-shift characteristic thereof. The indicating system additionally includes a cathode-ray tube having a ray-control electrode, a generator of saw-tooth oscillations, and means for controlling the saw-tooth generator periodically to deviate the frequency of the saw-tooth oscillations over said range of frequency deviation in synchronism with the generated first-named oscillations. There is also provided a second generator of saw-tooth oscillations having a period equal to the period of frequency deviation of the first-named oscillations, means individually responsive to the oscillations of the first and second saw-tooth generators for deflecting the ray of the cathode-ray tube in two directions normal to each other, means for deriving a control effect from the oscillations translated by the electrical apparatus, and means for supplying the control effect to the ray-control electrode to modulate the ray of the tube visually to indicate the phase-shift characteristic of the apparatus over the aforesaid range of frequency deviation.

For a better understanding of the present invention, together with other and further objects thereof, reference is had to the following description taken in connection with the accompanying drawings, and its scope will be pointed out in the appended claims.

Referring now to the drawings, Fig. 1 is a schematic diagram of a complete indicating system embodying the invention; Figs. 2, 6, 8, 10, and 12 are schematic diagrams representing alternative combinations of component units of the Fig. 1 arrangement; Fig. 3 graphically represents voltages occurring at certain points in the combination of component units represented in Fig. 2; and Figs. 4, 5, 7, 9, 11, and 13 illustrate visual patterns produced on the cathode-ray tube screen for individual combinations of component units represented in Figs. 2, 6, 8, 10, and 12.

Referring now more particularly to Fig. 1, there is represented in schematic diagram form a complete operating characteristic indicating system embodying the present invention in a preferred form. The indicating system includes a reference source of input periodic electrical waves comprising an oscillator 10 for generating oscillations of sinusoidal wave form, constant amplitude, and either of constant frequency or, if desired in certain applications, of any frequency in a predetermined range of frequencies. The output of the oscillator is applied to a test circuit 11 having connections for including the apparatus, the operating characteristics of which are to be indicated. A reference pulse generator 14 has its input circuit connected to a switch 13 having switch contacts 13a and 13b. Switch contact 13a is connected to the output of the oscillator 10, while switch contact 13b is connected to the output of the test circuit 11. The reference pulse generator 14 thus has applied thereto, dependent upon the position of switch 13, oscillations from the oscillator 10 or oscillations translated through the test circuit 11. The reference pulse generator 14 may be of any of several types well known in the art by which a potential pulse of short duration is derived at some fixed reference point in each cycle of the alternating voltage applied to the input of the generator. For example, generator 14 may be a vacuum tube having its input electrodes so biased that anode current flows only during a relatively constant portion of the peak of the positive half-cycles of voltage applied to the input electrodes. The output of the pulse generator 14 is thus a unidirectional potential of pulse wave form, the period of the pulses being equal to the period of the electrical wave applied to generator 14, and is applied to the control electrode G of a cathode-ray tube 15.

The cathode-ray tube 15 has a vertical deflecting system V, preferably of the electrostatic type comprising vertical deflecting electrodes, which is connected to a switch 16 having switch contacts 16a and 16b. Switch contact 16a is connected to the output of the test circuit 11 while switch contact 16b is connected to one blade 17 of a double-pole, double-throw switch 18. The second blade 19 of switch 18 is connected to the output of the oscillator 10. The switch blades 17, 19 are connected for unicontrol operation and have a pair of switch contacts 17a, 17b and 19a, 19b, respectively. The switch contacts 17a, 19a are connected together. Switch contact 19b is connected to the input of a reference pulse generator 20 which may be of the same type as the pulse generator 14 or of any other well-known type by which potential pulses of short duration are derived at a fixed reference point in each cycle of the alternating voltage applied to the input of the generator 20. The output of the pulse generator 20 is a unidirectional voltage of pulse wave form and is applied as a synchronizing signal to the frequency-controlling circuit of an oscillator 21 which generates linear oscillations of saw-tooth wave form. The output of the oscillator 21 is connected to the switch contact 17b of switch 18. Thus, the vertical deflecting system V of the cathode-ray tube 15 may have applied thereto, upon suitable selection by the switches 16 and 18, oscillations translated through the test circuit 11, oscillations generated by the oscillator 10, or oscillations of saw-tooth wave form generated by the oscillator 21.

The horizontal deflecting system H of the cathode-ray tube 15, also preferably of the electrostatic deflection type comprising deflecting-electrode elements of tube 15, is connected to a switch 22 having switching contacts 22a and 22b. Switch contact 22b is connected to the output of a saw-tooth oscillator 23, the output frequency of which has a value presently to be considered in greater detail in considering the operation of the invention. The switch contact 22a is connected to the output of a phase-shifting network 24, the input of which is selectively connectible through a switch 25 to the vertical deflecting system V of tube 15. The network 24 is an impedance network, the circuit elements of which have values proportioned to produce a 90-degree relative phase shift between the input and output alternating voltages translated by the network 24 at the frequency of the alternating voltages applied to the vertical deflecting system V. Thus, the horizontal deflection system of the cathode-ray tube 15 may be selectively connected by switch 22 either to the saw-tooth oscillator 23 or to the phase-shifting network 24.

The output of the saw-tooth oscillator 23 is also applied to a variable reactor device 26 to control the value of the actual or the simulated reactance thereof. The reactor device 26 is preferably a vacuum tube having its elements so connected that the anode current of the tube is out of phase with the anode voltage of the tube whereby the tube simulates a reactance. The variable reactor device 26 is selectively connectible through a switch 27 to the frequency-control circuit of oscillator 10. The device 26 thus varies the frequency of oscillations generated by oscillator 10 in accordance with the value of its reactance, actual or simulated.

It will be understood that the various units just described may be of a conventional construction and operation, the details of which are well known in the art, rendering further detailed description thereof unnecessary.

In considering the operation of the system just described, it will be assumed that the test circuit 11 includes an electrical apparatus, such as an impedance network, and that the operating characteristic of the apparatus which is to be indicated is its phase frequency characteristic. This characteristic of the apparatus may be indicated by the system in one of several ways, each of which will now be considered by reference to the schematic diagrams of Figs. 2, 6, 8, 10, and 12, which represent several alternative combinations of units of the system obtainable by the operation of the several switches 13, 16, 18, 22, 25, and 27.

An indication of the phase frequency characteristic of the test circuit 11 at a single predetermined frequency is obtained by closing switch 13 to contact 13a, closing switch 16 to contact 16a, and by opening switches 18, 22, 25, and 27. The resultant combination of units is shown in Fig. 2, the units omitted by the switching operation being omitted from Fig. 2 for purposes of simplicity. The oscillations generated by oscillator 10 are of sinusoidal wave form graphically represented in Fig. 3 by curve a. These oscillations are applied to the test circuit 11 and, after translation therethrough, appear in the output of the test circuit as sinusoidal oscillations graphically represented by the curve b of Fig. 3, it being assumed that the phase of the translated oscillations is retarded by the phase angle d, Fig. 3. The oscillations translated through test circuit 11 are applied to the vertical deflecting system V of the cathode-ray tube 15 and deflect the cathode ray of the tube to produce a linear trace on the screen of the tube as represented by the trace e of Fig. 4, this figure representing a view of the fluorescent screen of tube 15. Oscillations generated by oscillator 10 also are applied to the reference pulse generator 14 to derive therefrom a reference control potential of pulse wave form as graphically represented by curve c of Fig. 3. This control potential is applied to the control electrode G of tube 15 to modulate the cathode ray of the tube, whereby the trace e is modified by the periodic pulses to produce either a brightly-illuminated or dark spot f, Fig. 4, dependent upon the polarity of the pulse voltage applied to the control electrode. Since the peak amplitudes of the generated and translated oscillations occur at different times by virtue of the phase shift in test circuit 11, the spot f produced on the trace e is displaced from the end of the trace and the displacement is thus a measure of the phase shift of test circuit 11.

Where the reference pulse generator 14 is of the type which derives a reference potential pulse during the peak portion of each positive half-cycle of the oscillations generated by oscillator 10, as represented by curve c, Fig. 3, the spot f, Fig. 4, does not indicate whether the phase shift of the test circuit 11 is leading or lagging. This characteristic of the phase shift generally will be known from the nature of the test circuit, but, if unknown, it can be readily determined by the use of one or more additional units of the indicating system, as will presently be explained, or by the use of any of several well-known types of reference pulse generators which derive a pulse during each cycle of the oscillations of unit 10, when the oscillations have substantially zero amplitude. In the latter event, the center of the trace e will indicate zero phase shift and the individual ends g and h of the trace will indicate lagging and leading phase shift.

An appropriate calibration scale k may be provided on the end of tube 15 by which the displacement of the spot, and thereby the phase shift, is read directly from the resultant trace in terms of electrical degrees. If no phase shift occurs in test circuit 11, the generated and translated oscillations are consequently in phase and the spot f occurs at one end g of the trace e. The spot appears at the opposite end h of the trace e upon the occurrence of a phase shift of 180 electrical degrees in the test circuit.

It is evident from the operation just described that this simple indicating system is entirely satisfactory for phase shifts in test circuit 11 which do not exceed 180 degrees. The system can be used to indicate phase shifts greater than 180 degrees by closing the switch 22 to its contact 22b whereby there are applied to the horizontal deflection system H of the cathdoe-ray tube 15 saw-tooth oscillations from oscillator 23 which cause the ray of the tube to be deflected in a horizontal direction linearly with time. The latter connection of units by switch 22 is not specifically shown in the drawings but will be apparent from inspection of Figs. 1 and 2. This causes the trace e, shown in Fig. 4, to be spread out to produce a trace representative of several cycles of the oscillations translated through test circuit 11 as represented in Fig. 5 by the trace e'. Since the generated and translated oscillations have the same frequency, the pulses from the pulse generator 14 occur at a fixed time in each cycle of the translated oscillations, whereby there is produced on the trace e' of Fig. 5 a spot f' corresponding to each pulse of the control potential. The relative position of the spot f' with reference to the peak of each cycle graphically indicated by trace e' obviously provides a visual indication of the phase shift of the test circuit 11 up to a maximum phase shift of 360 electrical degrees.

A similar indication of the phase shift characteristic of test circuit 11, up to a maximum phase shift of 360 degrees, may be obtained by suitable operation of the several switches of the indicating system to obtain the combination of units represented in Fig. 6. In this arrangement of the units, the oscillations translated through test circuit 11 are applied both to the vertical deflecting system V of cathode-ray tube 15 and also to the phase-shifting network 24 which operates to shift the phase of the translated oscillations by 90 electrical degrees before applying the translated oscillations to the horizontal deflecting system H of the tube. The reference pulse voltage obtained from oscillator 10 through the reference pulse generator 14 is applied to the control electrode G of tube 15 as before. The trace produced on the screen of tube 15 is circular, as represented by the trace a of Fig. 7, and there is produced on this trace a spot b which indicates the phase shift of test circuit 11. A suitable calibration scale c may be provided on the end of the cathode-ray tube 15.

Figure 9:
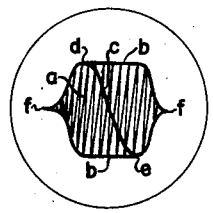

Both the amplitude frequency and phase frequency characteristics of test circuit 11 over a predetermined range of frequency deviation of oscillations applied thereto may be simultaneously indicated by operation of the several switches of the indicating system to obtain the combination of units represented in Fig. 8. In this arrangement of the units, oscillations generated by the saw-tooth oscillator 23 are applied to the variable reactor device 26, periodically to vary the value of its reel or simulated reactance. The variable reactor device controls the output frequency of oscillator 10 and consequently periodically varies the frequency of the oscillations generated by oscillator 10 over a predetermined range of frequency deviation. By applying the oscillations translated by test circuit 11 to the vertical deflecting system V of cathode-ray tube 15 and by applying the oscillations generated by saw-tooth oscillator 23 to the horizontal deflecting system H of tube 15, there is produced on the fluorescent screen of tube 15 for each cycle of oscillation of oscillator 23 a plurality of traces a, each successive one of which represents the amplitude of the translated oscillations at the successive frequencies of the range of frequency deviation. These traces are repeated at the frequency of the oscillator 23 which is conventionally such that the trace pattern appears to persist continuously. The envelope of these traces is represented in Fig. 9 by the envelope b. This envelope provides a visual indication of the amplitude frequency characteristic of the test circuit 11. The generated oscillations of oscillator 10 are also applied to the reference pulse generator 14 and the derived control potential of pulse wave form is applied to the control electrode G of tube 15. The period of the pulses of the control potential changes, of course, with the changing period of the generated oscillations. Assuming that the phase shift in test circuit 11 varies with the frequency of the generated oscillations applied thereto, a bright line c is produced on the pattern of traces a to provide a graphical representation of the phase transmission characteristic of test circuit 11. It is evident that a point d on curve c indicates zero phase shift through the test circuit while the point e on curve c indicates a phase shift of 180 electrical degrees, other points on curve c representing intermediate phase shifts.

Figure 10:
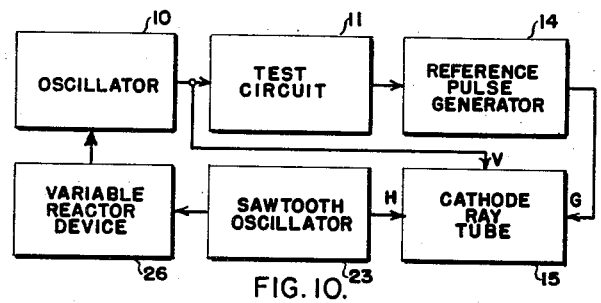
Figure 11:
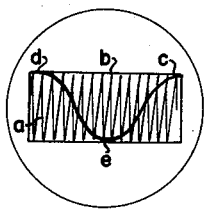
Figure 12:
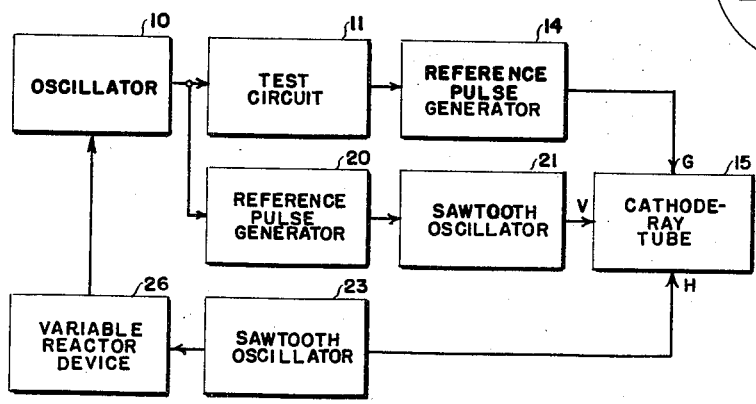

The phase frequency characteristic of test circuit 11 over a predetermined range of frequencies may be alone obtained by operating the several switches of the indicating system to provide the combination of units represented in Fig. 10. In this arrangement, the oscillations generated by the saw-tooth oscillator 23 and those generated by the oscillator 10 are applied to the respective horizontal and vertical deflecting systems of the cathode-ray tube 15 while the oscillations translated through test circuit 11 are applied to the reference pulse generator 14 to derive a control potential of pulse wave form which is applied to the control electrode G of tube 15. The amplitude of the oscillations generated by oscillator 10 are constant over the range of frequency deviation of the oscillator whereby there is produced on the screen of tube 15 a rectangular pattern of traces a, the envelope of which is represented in Fig. 11 by the envelope b. The reference pulse potential from the pulse generator 14 modulates the ray of tube 15 to produce on this pattern a curve c which graphically represents the phase frequency characteristic of test circuit 11. The coincidence of curve c with the upper side of envelope b, as at the point d, indicates zero phase shift through test circuit 11, while the coincidence of the curve c with the lower side of envelope b, as at e, indicates a phase shift of 180 degrees through test circuit 11.

Figure 13:
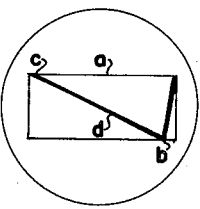

From the foregoing described operation of the several specified combinations of units of the indicating system of the invention, it will be evident that, since the vertical trace is produced by a sinusoidal alternating voltage, the displacement of the spot on this trace in providing an indication of the phase frequency characteristic of test circuit 11 is also a sinusoidal function of phase shift. The displacement of the spot may be made a linear function of phase shift by suitable operation of the several switches of the indicating system to provide the combination of units represented in Fig. 12. This arrangement of units is similar to that of Fig. 10 except that the oscillations generated by oscillator 10 are applied to the reference pulse generator 20 to derive therefrom a synchronizing voltage of pulse wave form similar to that graphically represented by curve c of Fig. 3. This synchronizing voltage is applied to the frequency-control circuit of saw-tooth oscillator 21 to control the frequency of the saw-tooth oscillations generated thereby. The saw-tooth oscillations of generator 21 are applied to the vertical deflecting system V of cathode-ray tube 15. The output of saw-tooth oscillator 23 is applied to the horizontal deflecting system H of tube 15 and also controls, through the variable reactor device 26, the frequency of the oscillations generated by oscillator 10. Thus, the oscillations generated by saw-tooth oscillator 21 are synchronized with those generated by oscillator 10 and deviate in frequency over the same range of frequency deviation. Both the horizontal and vertical deflections of the ray of tube 15 are thus linear with respect to time. The envelope of the trace pattern produced on the fluorescent screen of tube 15 by the horizontal and vertical deflecting systems is represented in Fig. 13 by the envelope a. The control potential of pulse wave form derived by pulse generator 14 from oscillations translated through test circuit 11 is applied to the control electrode G of tube 15 and the phase frequency characteristic of test circuit 11 is graphically reproduced as represented by curve d of Fig. 13. Since the vertical deflection of the cathode-ray beam is a linear function of time, the displacement of any point on curve d from the upper or lower sides of envelope a is a linear function of the phase shift of test circuit 11 at the frequency corresponding to the selected point. Inasmuch as the saw-tooth oscillations of oscillator 21 reach a peak amplitude displaced in time with respect to the peak amplitude of the translated sinusoidal oscillations, the coincidence of curve d with the lower side of envelope a, as at b, indicates a phase shift greater than 180 degrees but less than 360 degrees. In practice, only the portion c, b of curve d is used to provide an indication of the phase frequency characteristic of test circircuit 11. It may be noted that curve d is here illustrated as linear, indicating that the phase frequency characteristic of test circuit 11 is linear with frequency over the range of frequency deviation of oscillator 10.

From the above description of the invention, it will be apparent that the circuit connections between the oscillator 10 and the test circuit 11 and the output circuit connections of the latter unit comprise means for deriving from the reference source of input periodic waves, this source being the oscillator 10, and supplying to the test circuit 11 a sinusoidal electrical wave of a given frequency and for deriving an output periodic electrical wave therefrom modified in accordance with the phase-shift characteristic of the electrical apparatus included in the test circuit. The vertical deflecting system V of the cathode-ray tube 15 comprises means responsive to one of such input and output waves, specifically the output waves in the arrangements of Figs. 2, 6 and 8 and the input waves in Figs. 10 and 12, for producing a corresponding periodic trace. The reference pulse generator 14 comprises means for deriving a control effect, that is, a control potential of pulse wave form, from the other of such input and output waves, and the control electrode G of tube 15 comprises means responsive to this control effect for modifying the intensity of the aforementioned trace visually to indicate the phase-shift characteristic of the electrical apparatus at the aforesaid given frequency.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for visually indicating the phase-shift characteristic of an electrical apparatus comprising, a test circuit having connections for including the apparatus, a reference source of input periodic electrical waves, means for deriving from said source and supplying to said circuit a sinusoidal electrical wave of a given frequency and for deriving an output periodic electrical wave therefrom modified in accordance with the phase-shift characteristic of the apparatus, means responsive to one of said input and output waves for producing a corresponding periodic trace, means for deriving a control effect from the other of said input and output waves, and means responsive to said control effect for modifying said trace visually to indicate said phase-shift characteristic at said given frequency.

2. A system for visually indicating the phase-shift characteristic of an electrical apparatus comprising, a test circuit having connections for including the apparatus, a reference source of input periodic electrical waves, means for deriving from said source and supplying to said circuit a sinusoidal electrical wave of a given frequency and for deriving an output periodic electrical wave therefrom modified in accordance with the phase-shift characteristic of the apparatus, means responsive to said input waves for producing a corresponding periodic trace, means for deriving a control effect from said output waves, and means responsive to said control effect for modifying said trace visually to indicate said phase-shift characteristic at said given frequency.

3. A system for visually indicating the phase-shift characteristic of an electrical apparatus comprising, a test circuit having connections for including the apparatus, a reference source of input periodic electrical waves, means for deriving from said source and supplying to said circuit a sinusoidal electrical wave of a given frequency and for deriving an output periodic electrical wave therefrom modified in accordance with the phase-shift characteristic of the apparatus, means responsive to said output wave for producing a corresponding periodic trace, means for deriving a control effect from said input wave, and means responsive to said control effect for modifying said trace visually to indicate said phase-shift characteristic at said given frequency.

4. A system for visually indicating the phase-shift characteristic of an electrical apparatus comprising, a test circuit having connections for including the apparatus, a reference source of input periodic electrical waves, means for deriving from said source and supplying to said circuit a sinusoidal electrical wave of a given frequency and for deriving an output periodic electrical wave therefrom modified in accordance with the phase-shift characteristic of the apparatus, the period of said reference wave being equal to that of said derived wave, means responsive to one of said input and output waves for producing a corresponding periodic trace, means for deriving a control effect from the other of said input and output waves, and means responsive to said control effect for modifying said trace visually to indicate said phase-shift characteristic at said given frequency.

5. A system for visually indicating the phase-shift characteristic of an electrical apparatus comprising, a test circuit having connections for including the apparatus, means for providing a periodic voltage of saw-tooth wave form, a reference source of input periodic electrical waves, means responsive to said voltage of saw-tooth wave form for deviating the frequency of said input waves over a predetermined range of frequency deviation, means for deriving from said source and supplying to said circuit a sinusoidal electrical wave deviating in frequency over the same range of frequency deviation and for deriving an output periodic wave therefrom modified in accordance with the phase-shift characteristic of the apparatus, means responsive to said periodic voltage of saw-tooth wave form for producing a trace, means for deriving a control effect from said derived periodic wave, and means responsive to said control effect for modifying said trace visually to indicate said phase-shift characteristic over said range of frequency deviation.

6. A system for visually indicating the phase-shift characteristic of an electrical apparatus comprising, a test circuit having connections for including the apparatus, a reference source of input sinusoidal electrical waves, means for supplying said input waves to said circuit and for deriving an output periodic electrical wave therefrom modified in accordance with the phase-shift characteristic of said apparatus, means responsive to one of said input and output waves for producing a corresponding periodic trace, means for deriving a control effect from the other of said input and output waves, and means responsive to said control effect for modifying said trace visually to indicate said phase-shift characteristic at said given frequency.

7. A system for visually indicating the phase-shift characteristic of an electrical apparatus comprising, a test circuit having connections for including the apparatus, a reference source of input periodic electrical waves, means for deriving from said source and supplying to said circuit a sinusoidal electrical wave of a given frequency and for deriving an output periodic electrical wave therefrom modified in accordance with the phase-shift characteristic of the apparatus, means responsive to one of said input and output waves for producing a corresponding periodic trace, means for deriving from the other of said input and output waves a control potential having a pulse wave form, the period of the pulses of said control potential being equal to the period of said other of said input and output waves, and means responsive to said control potential for modifying said trace visually to indicate said phase-shift characteristic at said given frequency.

8. A system for visually indicating the phase-shift characteristic of an electrical apparatus comprising, a test circuit having connections for including the apparatus, a reference source of input periodic electrical waves, means for deriving from said source and supplying to said circuit a sinusoidal electrical wave of a given frequency and for deriving an output electrical wave therefrom modified in accordance with the phase-shift characteristic of the apparatus, means responsive to one of said input and output waves for producing a corresponding periodic trace, means for deriving a potential pulse at a fixed point in each cycle of the other of said input and output waves, and means responsive to said potential pulses for modifying said trace visually to indicate said phase-shift characteristic at said given frequency.

9. A system for visually indicating the phase-shift characteristic of an electrical apparatus comprising, a test circuit having connections for including the apparatus, a reference source of input periodic electrical waves, means for deriving from said source and supplying to said circuit a sinusoidal electrical wave of a given frequency and for deriving an output periodic electrical wave therefrom modified in accordance with the phase-shift characteristc of the apparatus, a cathode-ray tube having a ray-control electrode and ray-deflecting means, means responsive to one of said input and output waves for controlling said deflecting means to produce a corresponding periodic trace, means for deriving a control effect from the other of said input and output waves, and means for applying said control effect to said control electrode to modify the intensity of said trace visually to indicate said phase-shift characteristic at said given frequency.

10. A system for visually indicating the phase-shift characteristic of an electrical apparatus comprising, a test circuit having connections for including the apparatus, a reference source of input periodic electrical waves, means for deriving from said source and supplying to said circuit a sinusoidal electrical wave of a given frequency and for deriving an output periodic electrical wave therefrom modified in accordance with the phase-shift characteristio of the apparatus, a cathode-ray tube having a ray-control electrode and ray-deflecting means, means responsive to one of said input and output waves for controlling said deflecting means to produce a corresponding periodic trace, means for deriving a pulsating control potential from the other of said input and output waves, and means for applying said pulsating control voltage to said ray-control electrode for modifying the intensity of said trace visually to indicate said phase-shift characteristic at said given frequency.

11. A system for visually indicating the phase-shift characteristic of an electrical apparatus comprising, a test circuit having connections for including the apparatus, means for generating oscillations the frequency of which periodically deviates over a predetermined range of frequency deviation, means for supplying said oscillations to said circuit and for deriving therefrom oscillations translated by said electrical apparatus and modified in accordance with the phase-shift characteristic thereof, means for providing oscillations the period of which is equal to said period of frequency deviation of said generated oscillations, a cathode-ray tube having a ray-control electrode, means responsive to said last-named oscillations for deflecting the ray of said tube periodically in one direction, means responsive to said generated oscillations for deflecting the ray of said tube periodically in a direction normal to said first-named direction, means for deriving a control effect from the oscillations translated through said apparatus, and means for applying said control effect to said ray-control electrode to modulate the ray of said tube visually to indicate said phase-shift characteristic over said range of frequency deviation.

12. A system for visually indicating the phase-shift characteristic of an electrical apparatus comprising, a test circuit having connections for including the apparatus, means for generating oscillations the frequency of which periodically deviates over a predetermined range of frequency deviation, means for supplying said oscillations to said circuit and for deriving therefrom oscillations translated by said electrical apparatus and modified in accordance with the phase-shift characteristic thereof, means for providing oscillations of saw-tooth wave form the period of which is equal to said period of frequency deviation of said generated oscillations, a cathode ray tube having a ray-control electrode, means responsive to said generated oscillations for deflecting the ray of said tube periodically in one direction, means responsive to said oscillations of saw-tooth wave form for deflecting the ray of said tube periodically in a direction normal to said first-named direction, means for deriving a control effect from the oscillations translated through said apparatus, and means for applying said control effect to said ray-control electrode to modulate the ray of said tube visually to indicate said phase-shift characteristic over said range of frequency deviation.

13. A system for visually indicating the phase-shift characteristic of an electrical apparatus comprising, a test circuit having connections for including the apparatus, means for generating oscillations of a given frequency, means for supplying said oscillations to said circuit and for deriving therefrom oscillations translated by said apparatus and modified in accordance with the phase-shift characteristic thereof, means for generating oscillations of saw-tooth wave form, means for maintaining the frequency of said saw-tooth oscillations equal to that of said generated oscillations, a cathode-ray tube having a ray-control electrode and ray-deflecting means, means for applying said oscillations of saw-tooth wave form to said ray-deflecting means to produce a periodic trace the periodicity of which corresponds to that of said generated oscillations, means for deriving a control effect from the oscillations translated through said apparatus, and means for applying said control effect to said ray-control electrode to modulate the ray of said tube visually to indicate said phase-shift characteristic at said given frequency.

14. A system for visually indicating the phase-shift characteristic of an electrical apparatus comprising, a test circuit having connections for including the apparatus, a reference oscillator for generating oscillations, means for supplying said oscillations to said circuit and for deriving therefrom oscillations translated by said electrical apparatus and modified in accordance with the phase-shift characteristic thereof, a cathode-ray tube having a ray-control electrode, a second oscillator for generating oscillations, means for frequency-modulating said reference oscillator with said last-named oscillations periodically to deviate over a predetermined range of frequency deviation the frequency of oscillations generated by said reference oscillator, means responsive to oscillations generated by said second oscillator for deflecting the ray of said tube in one direction, means responsive to said generated reference oscillations for deflecting the ray of said tube in a direction normal to said one direction, means for deriving a control effect from the oscillations translated through said apparatus, and means for applying said control effect to said ray-control electrode to modulate the ray of said tube visually to indicate said phase-shift characteristic over said range of frequency deviation.

15. A circuit for visually indicating the phase-shift characteristic of an electrical apparatus comprising, a test circuit having connections for including the apparatus, a reference oscillator for generating oscillations, means for supplying said oscillations to said circuit and for deriving therefrom oscillations translated by said electrical apparatus and modified in accordance with the phase-shift characteristic thereof, a cathode-ray tube having a ray-control electrode, a second oscillator for generating oscillations, means for frequency-modulating said reference oscillator with said last-named oscillations periodically to deviate over a predetermined range of frequency deviation the frequency of oscillations generated by said reference oscillator, means responsive to oscillations generated by said second oscillator for periodically deflecting the ray of said tube in one direction, means responsive to said translated oscillations for periodically deflecting the cathode ray of said tube in a direction normal to said first-named direction, means for deriving a control effect from said generated reference oscillations, and means for applying said control effect to said ray-control electrode to modulate the ray of said tube visually to indicate said phase-shift characteristic over said range of frequency deviation.

16. A system for visually indicating the phase-shift characteristic of an electrical apparatus comprising, a test circuit having connections for including the apparatus, a reference oscillator for generating an input periodic electrical wave, means for supplying said input wave to said circuit and for deriving therefrom an output wave translated by said electrical apparatus and modified in accordance with the phase-shift characteristic thereof, a cathode-ray tube having a ray-control electrode, a second oscillator for generating oscillations, a variable reactance device coupled to said reference oscillator to control the frequency thereof, means responsive to the oscillations of said second oscillator for periodically varying the reactance of said reactance device, thereby to deviate the frequency of said reference oscillator periodically over a predetermined range of frequency deviation, means responsive to the oscillations of said second oscillator for periodically deflecting the ray of said tube in one direction, means responsive to one of said input and output waves for deflecting the ray of said tube in a direction normal to said one direction, means for deriving a control effect from the other of said input and output waves, and means for applying said control effect to said ray-control electrode to modulate the ray of said tube visually to indicate said phase-shift characteristic over said range of frequency deviation.

17. A system for visually indicating the phase-shift characteristic of an electrical apparatus comprising, a test circuit having connections for including the apparatus, means for generating reference oscillations the frequency of which periodically deviates over a predetermined range of frequency deviation, means for supplying said oscillations to said circuit and for deriving therefrom oscillations translated by said electrical apparatus and modified in accordance with the phase-shift characteristic thereof, a cathode-ray tube having a ray-control electrode, a generator of saw-tooth oscillations, means for controlling said saw-tooth generator periodically to deviate the frequency of said saw-tooth oscillations over said range of frequency deviation in synchronism with said first-named oscillations, an oscillator for generating oscillations the period of which is equal to the period of frequency deviation of said first-named oscillations, means individually responsive to the oscillations of said saw-tooth generator and said oscillator for deflecting the ray of said tube in two directions normal to each other, means for deriving a control effect from said oscillations translated by said apparatus, and means for supplying said control effect to said ray-control electrode to modulate the ray of said tube visually to indicate said phase-shift characteristic over said range of frequency deviation.

BERNARD D. LOUGHLIN.